E. H. VINCENT.
TIRE LOCKING DEVICE.
APPLICATION FILED JUNE 6, 1919.
1,390,402.
Patented Sept. 13, 1921.
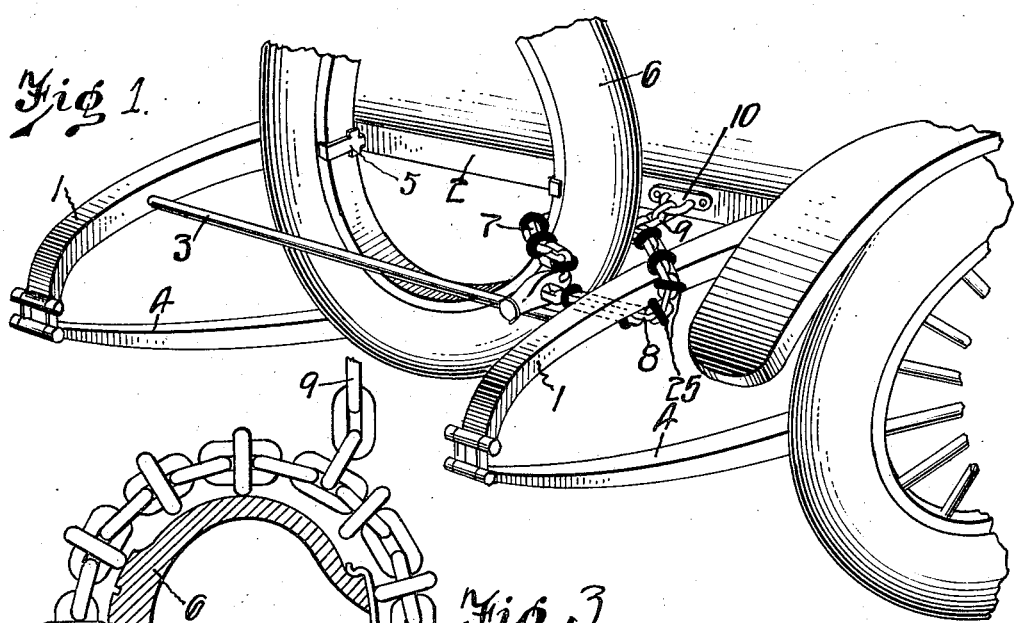
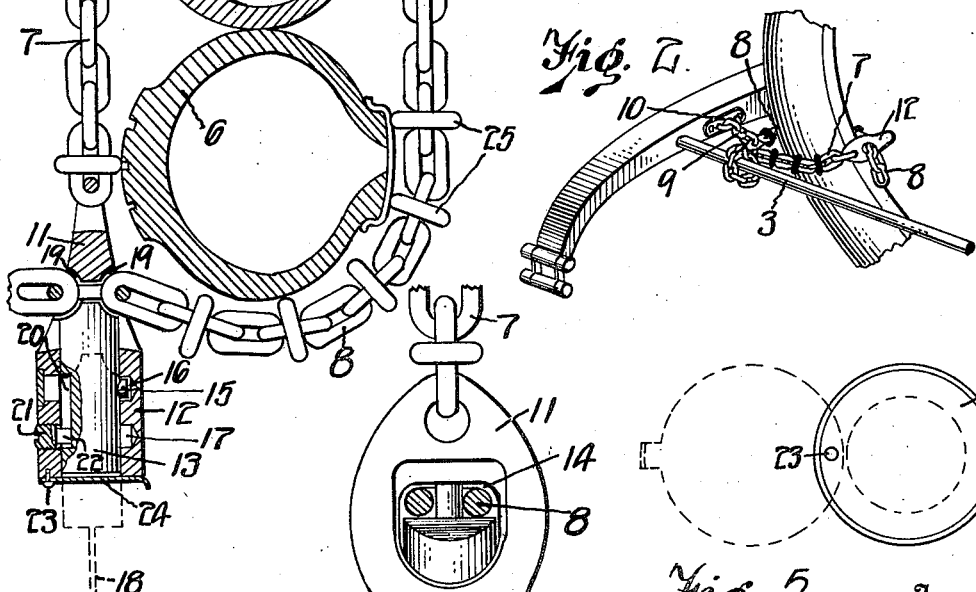
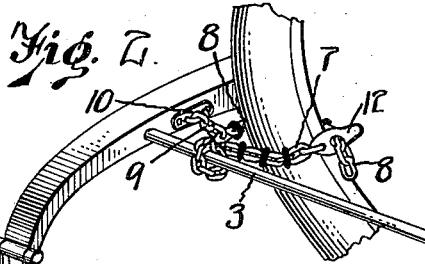
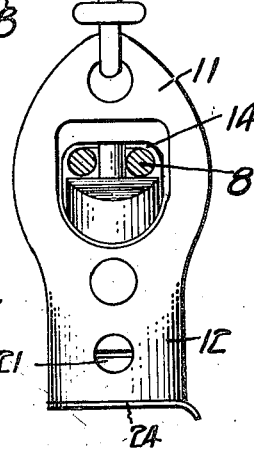
Inventor
Edward H. Vincent,
By Pagelsen & Spencer
Attorneys

UNITED STATES PATENT OFFICE.

EDWARD H. VINCENT, OF DETROIT, MICHIGAN.

TIRE-LOCKING DEVICE.

1,390,402.  Specification of Letters Patent.  Patented Sept. 13, 1921.

Application filed June 6, 1919. Serial No. 302,170.

*To all whom it may concern:*

Be it known that I, EDWARD H. VINCENT, a citizen of the United States, and residing at Detroit, in the county of Wayne and State of Michigan, have invented a new and Improved Tire-Locking Device, of which the following is a specification.

The present invention relates to locking means whereby an extra tire or tires, rim or wheel may be attached to a motor vehicle in such manner as to be secure against theft.

One feature of the invention resides in a lock chain which is passed around the tire or wheel rim and attached intermediate its ends to a permanent part of the vehicle, say the rear cross-bar or a side bar, said chain also being preferably arranged to encircle a permanent or fixed part of the vehicle, such as a side bar or a rear cross-rod. In this manner a double securing effect is attained, and the chain is, moreover, in the preferred embodiment of the invention wherein the intermediate connection is of a permanent or non-detachable nature, always in position ready for use whereby the danger of the driver neglecting to lock the tire or wheel, such as occurs when the tire is not anchored to the vehicle, is largely avoided.

Again, the invention is concerned with certain details of the lock whereby a large shearing area is provided against the separation of the parts of the chain from one another, and whereby a neat compact construction is afforded; also in certain means for excluding mud and dust from the key hole or slot.

In the drawings, Figures 1 and 2 are fragmentary perspective views showing different ways of applying the invention. Fig. 3 is an enlarged sectional view, two tires being shown. Fig. 4 is a fractional side of the lock forging or housing, the chain link appearing in section. Fig. 5 is an end view of the lock housing, showing the mud guard.

The rear end portions 1 of the frame side bars, the rear cross-bar 2 and cross-rod 3 (if used), springs 4, and tire carrier 5 are, or may be, of ordinary or desired construction; and the spare tire or tires, rim or wheel appears at 6. The hardened tire lock chain is formed in three branches or runs 7—8—9 of which the first two form a main portion that encircles the tire or tires, rim or wheel 6, whereas the branch 9 leads from a point preferably near the middle of the portion 7—8 and is secured to some fixed rigid portion of the vehicle. In the embodiment shown in Fig. 1, the connection is made to the cross-bar 2, while in Fig. 2 it is made with the side bar 1; and in each case, the anchorage is formed by a fixture 10 which is permanently riveted in place, but it will be understood that other constructions wherein the chain is non-removable while the parts are in locking position may be used.

The branch 7 terminates in a lock forging or housing 11 the outer end or body portion 12 of which is preferably substantially cylindrical and drilled out longitudinally centrally to receive a lock barrel 13. Formed in the housing is a transverse opening 14 large enough to permit the chain 8 to be passed therethrough and drawn up to the desired adjustment with reference to the associated parts when the lock barrel is in the unlocked position indicated in dashed lines in Fig. 3, it being understood that the lock barrel is slidable in the housing from this dashed line position to the locking position indicated in full lines, and that it is provided with outwardly spring pressed pin or detent 15 receivable in either of two internal openings or sockets 16—17 to hold the lock barrel at the corresponding limit of its movement. The lock barrel contains means, not shown, for retracting the pin 15 upon properly manipulating the key 18, and is preferably shaped at its end to substantially conform to the haunches of adjacent parallel links, as shown at 19, so that practically the entire cross-section of the barrel is presented as shearing area against any effort to withdraw the chain. In this manner a very strong and compact device is secured. By slotting the barrel longitudinally at 20 and by providing the screw 21 having its end 22 received therein, the lock barrel is prevented from turning about its own axis and its end is always presented in proper locking relation to the chain.

In the event no means were provided to prevent it, mud and dust might get into the key slot in the lock barrel, and I therefore preferably pivot on the housing at 23 a disk or plate 24 swingable to either of the positions indicated in Fig. 5 to cover or uncover the face of the barrel.

Rattling of the chain is prevented by suitable rings or other shields 25 of rubber or the like, the construction in this particular being subject to wide variation.

I claim:—

In combination with two permanent parts of a vehicle and a spare tire or wheel carried by said vehicle, a three-branched chain having one branch anchored to one of said permanent parts and the other two branches passing about said tire or wheel and also about said other permanent part, and lock means for securing together the ends of said other two branches for preventing the unauthorized removal of said chain from said tire or wheel.

EDWARD H. VINCENT.